US006667891B2

(12) United States Patent
Coglitore et al.

(10) Patent No.: US 6,667,891 B2
(45) Date of Patent: Dec. 23, 2003

(54) COMPUTER CHASSIS FOR DUAL OFFSET OPPOSING MAIN BOARDS

(75) Inventors: Giovanni Coglitore, Los Gatos, CA (US); Nikolai Gallo, Menlo Park, CA (US); Jack Randall, Ben Lomond, CA (US)

(73) Assignee: Rackable Systems, Inc., San Jose, CA (US)

( * ) Notice: Subject to any disclaimer, the term of this patent is extended or adjusted under 35 U.S.C. 154(b) by 30 days.

(21) Appl. No.: 09/789,602

(22) Filed: Feb. 20, 2001

(65) Prior Publication Data

US 2002/0118514 A1 Aug. 29, 2002

Related U.S. Application Data

(60) Provisional application No. 60/183,478, filed on Feb. 18, 2000.

(51) Int. Cl.[7] .............................. G06F 1/16; H05K 7/14
(52) U.S. Cl. ........................................ 361/796; 361/784
(58) Field of Search ........................ 361/687, 748–796; D14/313, 440, 441

(56) References Cited

U.S. PATENT DOCUMENTS

| 4,702,154 | A | | 10/1987 | Dodson |
|---|---|---|---|---|
| 4,728,160 | A | | 3/1988 | Mondor et al. |
| 4,901,200 | A | | 2/1990 | Mazura |
| 5,136,464 | A | | 8/1992 | Ohmori |
| 5,216,579 | A | * | 6/1993 | Basara et al. ............... 361/683 |
| D350,333 | S | * | 9/1994 | Sharp ......................... D14/355 |
| 5,398,159 | A | | 3/1995 | Andersson et al. |
| 5,432,674 | A | | 7/1995 | Hardt |
| 5,460,441 | A | | 10/1995 | Hastings et al. |
| 5,515,239 | A | | 5/1996 | Kamerman et al. |
| 5,528,454 | A | | 6/1996 | Niklos |
| 5,587,877 | A | | 12/1996 | Ryan et al. |
| 5,602,721 | A | | 2/1997 | Slade et al. |
| 5,691,883 | A | | 11/1997 | Nelson |
| 5,793,616 | A | * | 8/1998 | Aubuchon et al. .......... 361/784 |
| 5,813,243 | A | | 9/1998 | Johnson et al. |
| 5,896,273 | A | | 4/1999 | Varghese et al. |
| 5,909,357 | A | | 6/1999 | Orr |
| 5,947,570 | A | | 9/1999 | Anderson et al. |
| 5,956,227 | A | | 9/1999 | Kitaoka |
| 6,052,276 | A | * | 4/2000 | Do et al. ..................... 361/684 |
| 6,195,493 | B1 | * | 2/2001 | Bridges ...................... 385/134 |

OTHER PUBLICATIONS

U.S. patent application Ser. No. 60/270,405, Coglitore, filed Feb. 20, 2001.

(List continued on next page.)

Primary Examiner—Darren Schuberg
Assistant Examiner—Anthony Q. Edwards
(74) Attorney, Agent, or Firm—Morrison & Foerster LLP

(57) ABSTRACT

This invention involves the efficient placement of a pair of main boards within a given computer chassis. The available density of CPUs and main boards that may be provided for a given chassis height is advantageously increased through the use of a dual opposing main board configuration. With this configuration, two main boards are mounted opposing each other within a chassis. They are placed such that their I/O connectors are on the same side of the main board to improve usability. They are also mounted within the chassis so the components on the main boards (such as the cards, CPU fans, CPU heat sinks, etc.) do not physically interfere with each other. This configuration improves CPU density and cooling, especially when stacked with like chassis.

22 Claims, 7 Drawing Sheets

OTHER PUBLICATIONS

U.S. patent application Ser. No. 60/183,478, Coglitore et al., filed Feb. 18, 2000.

U.S. patent application Ser. No. 09/479,824, Coglitore et al., filed Jan. 7, 2000.

U.S. patent application Ser. No. 60/161,578, Coglitore et al., filed Oct. 26, 1999.

U.S. patent application Ser. No. 29/118,970, Coglitore et al., filed Feb. 18, 2000.

U.S. patent application Ser. No. 60/270,338, Coglitore, filed Feb. 20, 2001.

Anonymous, "Cobalt RaQ 2," at <http://www.cobalt.com/products/pdfs/datasheet.raq2.pdf> (visited on Nov. 27, 2000), 2 pages.

Anonymous, "Cobalt RaQ 3," at <http://www.cobalt.com/products/pdfs/datasheet.raq3.pdf> (visited on Nov. 27, 2000), 2 pages.

Anonymous, "Cobalt RaQ 4," at <http://www.cobalt.com/products/pdfs/datasheet.raq4.pdf> (visited on Nov. 27, 2000), 2 pages.

Anonymous, "SGI—O2 Workstation Product Overview," at <http://www.sgi.com/o2/overview.html> (visited on Sep. 8, 2000), 4 pages.

Anonymous. (Mar. 10, 1988). "Silicon Graphics Unveils Dedicated, Entry–Level Hosting Solution," Press Release at <http://www.sgi.com/newsroom/press_releases/1998/march/o2webserver_release.html> (visited on Jan. 6, 2000), 2 pages.

* cited by examiner

COMPUTER CHASSIS FOR DUAL OFFSET OPPOSING MAIN BOARDS

RELATED APPLICATIONS

This application claims the benefit under 35 U.S.C. §119(e) of provisional patent application Serial No. 60/183,478 titled SYSTEM FOR DUAL, OFFSET AND OPPOSING MAIN BOARD COMPUTERS to Coglitore et al. filed Feb. 18, 2000 which is incorporated by reference herein in its entirety.

FIELD OF THE INVENTION

This invention relates to the placement of multiple main boards within a given computer chassis. The available density of CPUs and main boards that may be provided in a given chassis and at a given location is advantageously increased through various features. The efficient design and highly-effective cooling allows the chassis to be packaged with a higher CPU density while still preventing thermal damage to the internal components.

BACKGROUND OF THE INVENTION

There exists a need for compact computer systems in the server industry. It is this very need which has justified acceptance of current compact systems despite their performance and thermodynamic disadvantages. Especially with the advent and rise of the Internet and World Wide Web, an increasing demand for more computers to serve as network hosts or servers has arisen.

The function of network servers may be carried out by more traditional "servers" in the form of powerful computers usually configured to perform specific functions. Another more recently developed model in providing network services is with grouped computers or "modules" linked through software such as the VNC software package available through Oracle, Inc. to form a "farm" or "puzzle" of computers working together. Computers set up in a farm will include their own processors, data drives and other necessary components in order that each may accomplish a fraction of the work intended for the farm.

Farms have several advantages over typical servers. One such advantage is the combined speed of processors working together in the farm. Another advantage resides in the redundancy of a farm's structure. When any one module fails, it can be extracted or replaced with no ill effect other than a fractional loss of capacity. Put another way, failure of part of a farm does not shut down the whole. In contrast, when any portion of a server fails, the whole system may go down. If the failure itself does not cause the loss, shutting down the computer for a necessary repair certainly will.

Irrespective of the type of network host that might be employed, it is clear that there is a growing need for compact, serviceable network resources. This has lead to an increasing need for space in which to house the network host units and a consolidation of spaces where they are located. Privately owned "co-location" sites rent space and facilities to house numerous networked computers. Rent calculations are based on the floor space occupied and the bandwidth handled by the computers occupying the space. Because of the relationship between these factors, it will often be in favor of both a co-location site and a computer service provider to maximize both the density and performance efficiency of the computers. By increasing the density at which CPUs can be packed onto a main board, main boards can be packed into computers and computers can be packed into an a given area, the service provider benefits since less space is required for a given number of CPUs (and therefore processing power and bandwidth); the co-location site benefits since the ultimate bandwidth available in association with the space may be greatly increased.

Typically, at a site where numerous computers are connected to a network, the computers are stacked in racks arranged in repeating rows or cells. Access to the computers is necessary for servicing, upgrading hardware, loading software, attaching cables, switching power on and off and so-forth. The elimination of as much access space as feasible can increase the density of computer systems that may be provided for a given square footage of area at a site. Consequently, there exists a need to eliminate extraneous access space while still maintaining the use of relatively inexpensive, standard (or more-or-less standard) racks.

Typical computer chassis utilize a front-and-back configuration with cables and wires attached to the back of the chassis and switches, drives, and displays in the front. This is considered advantageous since cables and wires not often requiring access are isolated on the opposite side of the machine from components such as drives and the like which do require regular access. Wires and cables are kept out of the way of such components.

This design prevails in the server/host network environment as well as the desktop computer environment. Departing from this rack layout involves completely reorienting the placement and relation of components within a computer chassis. Furthermore, in an industry where backward compatibility is a consideration and the rack layout of computers for front-and-back access is pervasive because of the perceived advantages, extensive modification of computer chassis for single-sided access represents a significant departure from the computer industry packaging and handling norms. U.S. patent application Ser. No. 09/479,824, titled HIGH DENSITY COMPUTER EQUIPMENT STORAGE SYSTEM filed Jan. 7, 2000 and Provisional Application Serial No. 60/161,578, titled HIGH DENSITY COMPUTER EQUIPMENT STORAGE SYSTEM filed Oct. 26, 1999 to Coglitore et al. discloses what is believed to be the first major departure from that standard.

In this patent application, and as typical in the server industry, individual computer chassis are fitted with one main board and additional components including hard drives, power supplies, etc. Although higher CPU density is desired, the only significant improvement in CPU density per chassis in recent years has been the manufacture of two CPUs per main board instead of one. A major hurdle preventing increased CPU density in chassis has been the inability to pack CPUs close enough together as to efficiently use the space within the chassis and maintain acceptable operating temperatures for the CPUs and surrounding components. Features useable with the present invention meet this need. Additional features of the present invention allow for doubling the number of CPUs that may be provided in a chassis, thereby meeting the ever-present need for more computing power. It does so by enabling the use of two main boards within a single, shallow chassis.

SUMMARY OF THE INVENTION

This invention is a system designed to maximize the density of computers that may be provided in a given space. Several features of the invention enable one to provide a higher density of CPUs in a single chassis, and therefore, a higher density of CPUs at a site. Preferably, the computers are built from standardized or readily-available components.

This invention includes a computer chassis capable of housing two main boards having I/O's where the main boards are oriented offset from one another with their processor sides in opposition. The constituent components of the chassis as well as the chassis with associated parts, built-up to form a computer, as described and shown herein, and such other aspects as clearly conveyed to one with skill in the art form aspects of the present invention. Combinations of aspects of specific variations of the invention or combinations of the specific variations themselves are within the scope of this disclosure.

The offset and opposing orientation of main computer boards possible in this invention provides for a chassis which may house two standard (or more-or-less standard) main boards at a chassis that is merely 2 U in height. It may have overall width that will preferably fit within a standard 19 inch rack be mounted to telco-style rack or otherwise. Further, in preferred variations of the invention, slots between the main board I/O areas may be provided for access to boards or cards receivable in slots or ports of either or each of the main boards employed.

Since bays for removable media drives are not typically included in at least the face portions of the chassis of this invention, functions that would otherwise be performed by such internal devices may be accomplished by portable devices that may be connected though the access slots. Sometimes, hardware support for external bootable drives such as CD, DVD or 3.5 inch floppy drives or PCMCIA devices will be provided in a built-up machine. One advantageous configuration for the slots is to provide an AGP and an Ethernet or one of various PCI boards for each main board and provide a vent grill in a central, larger slot—rather than filling all of the slots with boards. Instead of providing a grill for one or more open slots, however, a plate may altogether block access. Likewise, a cover plate may be used to block any vents provided as desired.

The chassis of this invention may be configured to receive any typical or modified main board I/O shield. Alternatively, the shield features through which various main board I/O's are accessed may be integrated into the front of the chassis. In either case, I/O ports are provided.

Preferably, chassis as shown and described herein are produced, mounted vertically in racks (back-to-back, in a single-depth arrangement with back and/or side space or another arrangement), optionally employ cooling flow through the chassis in one direction or another and may otherwise be used like those disclosed in Provisional Application Serial No. 60/161,578, titled HIGH DENSITY COMPUTER EQUIPMENT STORAGE SYSTEM filed Oct. 26, 1999; U.S. patent application Ser. No. 09/479,824, titled HIGH DENSITY COMPUTER EQUIPMENT STORAGE SYSTEM filed Jan. 7, 2000; and U.S. Design Pat. Application Serial No. 29/118,970, titled COMPUTER CHASSIS FOR DUAL, OPPOSING MAIN BOARDS filed on Feb. 18, 2000, each to Coglitore et al.

Generally, as used in producing computers built with the inventive chassis, power cords are connected at a port leading to a shared power supply providing for the consumption of 30–40 amps of current for 80 computers built with a preferred main board such as Intel model 815EAL or 810E boards, optionally, including Ethernet capability. Other components such as hard drives (up to two on each side of the chassis or more), fans (up to 3 or more standardized 80 mm fans or more) resets switches and boards or cards of various utility (such as Ethernet, video, SCSI and so-forth) may also be included. Further, remote on/off circuitry, split or dual component power supplies and/or other useful options such as one or more baskets for housing disk drives may be provided. To support the front corner of the upper main board where it overlaps with the other main board, a standoff may be provided as well.

The inventive chassis and any computers built with the chassis may be produced complete either with or without a top cover. By close-stacking of the units in a rack, the bottom of one unit may serve as the top for that below, resting on an edge or lip around the lower chassis. In such event, only the computer at the top of a stack should include a top cover.

Further, it is noted that placement, configuration and/or the number of any of the vents provided may be varied. Examples of such variation are presented in the above-reference applications. Rear and/or side vent placement is contemplated. Front vents above and below the respective main board I/O areas are preferably included, but may be omitted as may any others. For the front vents, a rectangular shape is preferred since it maximizes area for cooling flow to pass through the front of the chassis. Any vents provided may include a grill, be fully open, be associated with a custom grill or covered by a stock grill such as that of a preferred power supply which includes its own fan and screen or grill.

A critical aspect of the invention is the dual opposing main board internal configuration. This configuration increases the density of the CPUs in each chassis. This increased density is possible because the chassis configuration provides clearance for motherboard mounted components, such as heat sinks and fans. Two motherboards are usually placed on opposing sides of the chassis and turned 180 degrees with respect to each other. This provides for physical clearance between the components on the motherboards.

A benefit of this configuration is the higher motherboard density, and therefore CPU density. With two motherboards inside of a chassis (instead of just one), the density of motherboards, and more importantly, the density of microprocessors and microprocessing power is doubled.

This interior configuration also provides better airflow for cooling. The dual opposing main board configuration narrows the airflow channel between the main boards, thereby increasing the speed of the airflow. Based on common heat transfer principles, with all other factors remaining the same, faster airflow improves cooling.

The dual opposing main board orientation also improves serviceability, especially for such tightly packed components. One or both motherboards may be mounted on the interior of a lid or door of the chassis. These doors may be hinged and opened or removed, thereby providing a working platform with a fully exposed motherboard. This provides easier access to the motherboard and components on the motherboard. The dual opposing main board configuration of the present invention may be accomplished in a single chassis with or without a lid as described above.

BRIEF DESCRIPTION OF THE DRAWINGS

Each of the following figures diagrammatically illustrates aspects of the present invention. The illustrations are examples of the invention described herein. It is contemplated that combinations of aspects of specific variations or combinations of the specific variations themselves are within the scope of this disclosure. The figures merely provide examples or variations of the broader invention described.

DETAILED DESCRIPTION

Figure 1:
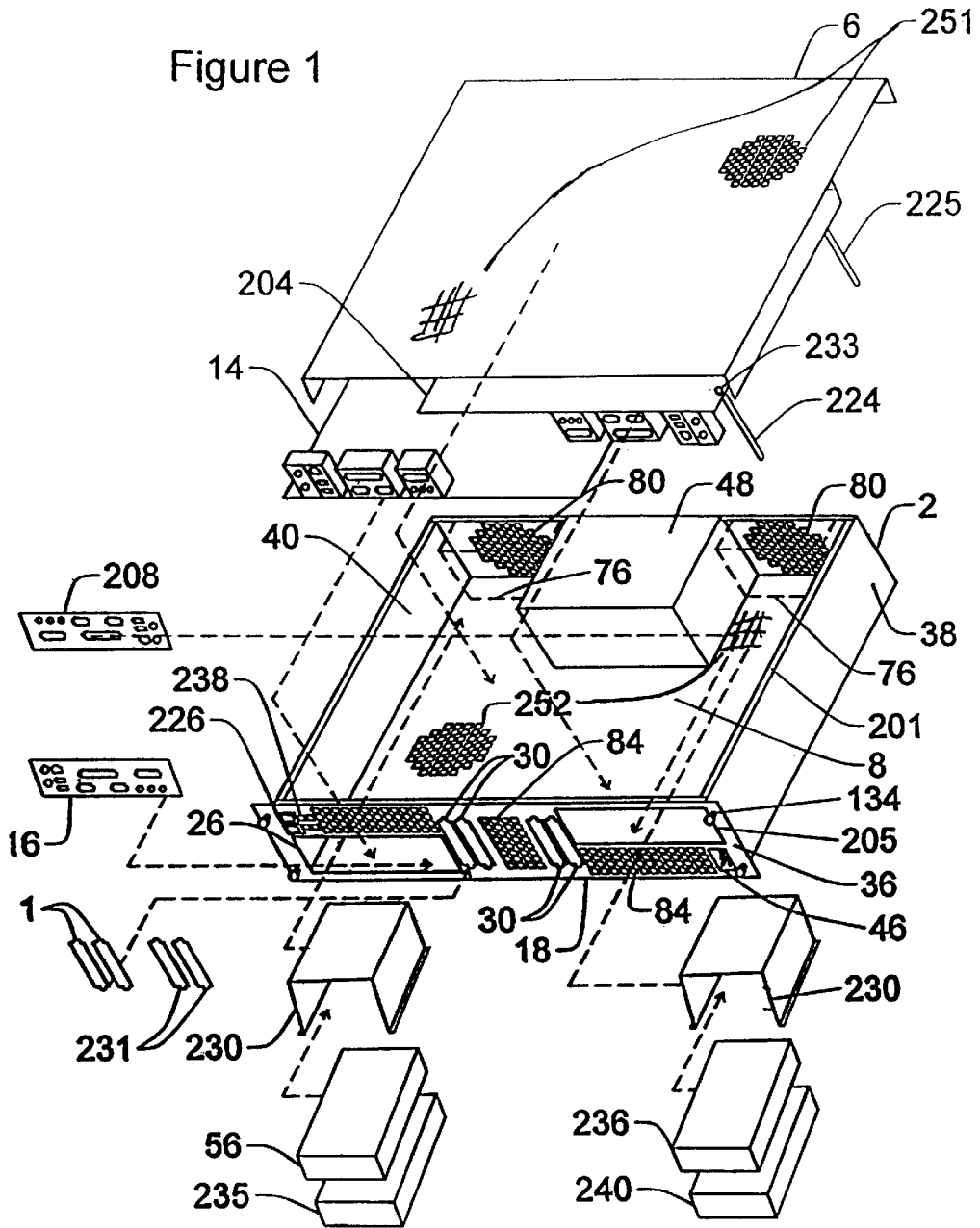
FIG. 1 shows an exploded perspective view of a configuration of the inventive chassis as it may be built-up with certain components to form a computer.

FIG. 1 shows a configuration of the inventive chassis as it may be assembled with standard components. Although the use of standard components is preferred, none of the components must be so.

Chassis 2 will usually include a chassis body and chassis cover 6. Main board compartment 8 includes space for internal components and may be subdivided if desired. Preferably, main board compartment 8 is sized to fit two ATX rack layout main board 14. Preferred main boards include models 815EAL, N44BX, L44GX, and C440GX by Intel, Inc. Such main boards typically have I/O components that fit I/O shield 16. Chassis 2 is preferably made of zinc plated mild steel sheet metal, with front panel 18 painted. Rivets, welds or other suitable fastening methods may be used to secure various components and hold the chassis body in shape.

Main board compartment 8 is sized to include room for first main board 16 and second main board 204 in a dual opposing main board configuration. In this configuration, shown in FIG. 1, first main board 14 is mounted near the bottom of main board compartment 8 and second main board 204 is mounted near the top of main board compartment 8. The second main board 204 opposes and overlaps the first main board 14. Main boards 14 and 204 are positioned such that components mounted on the main boards face, but do not physically interfere with each other. This configuration places the main boards in as close a proximity to each other as feasible. Accordingly, the configuration takes up less vertical space than two main boards mounted in separate chassis. Furthermore, the outlets with I/O connectors are all located on the same side of the main boards to increase usability of chassis 2.

Chassis size or main board placement (so long as an opposing, overlapped configuration is maintained) may be varied. The variation shown in FIG. 1 is 2 U or about 3½ inches tall. Especially when using different CPU configurations, alternate heights may be advantageous. 3 U or greater height configurations may be advantageous for use with larger processors such as the XEON processor being produced by Intel, Inc. Other standardized and non-standardized chassis heights and shapes may also be used depending primarily on the size of components, the amount of open space desired within main boards 16 and 204 and the size or shape of the space available to locate the chassis.

Support structures may be used if a main board is to be held away from a chassis wall (be it side 38, 40, top or cover 6, bottom, internal wall, or other wall). In FIG. 1, second main board 204 is shown elevated from the chassis bottom via front motherboard support 224 and rear motherboard support 225. Additional motherboard supports may be used or placed in alternate configurations.

In a possible configuration, first main board shield 16 will be provided in first I/O port 26 in front panel 18 of chassis body 4. First main board shield 16 is a conmmonly-used panel that fits into first I/O port 26 and has openings for I/O components—particularly those connected to a main board—inside chassis 2 to communicate with I/O components outside the computer (such as a network cable, keyboard, monitor, etc.). Second main board shield 208 for second I/O port 205 provided in front panel 18 in a similar fashion to first I/O port 26 for first main board shield 16.

Front panel 18 may also be configured to further accessorize chassis 2. A port in the front panel for an external SCSI connection or other such device may also be provided. Optional ports 30 of such a size to fit numerous connectors, such as a parallel port connector or ports for Ethernet cards, which can fit in either or both main boards 14 and 204. If any of optional ports 30 are built into chassis 2, but are not used, they may be covered by optional port plate 231. Further, ports 226 for switches are optionally provided.

Front panel 18 defining the various ports may be configured to attach chassis 2 to a rack by interface sections 36 extending from sides 38, 40 of chassis 2. Integrated bolts 134 may be used to connect chassis 2 to a rack. However, any suitable method of attaching the chassis to a rack may be used.

In the variation shown in FIG. 1, an optional port 46 accommodating a power cord 227 (shown in FIG. 2) fitting to a power supply 48 to be housed in the chassis 2 is provided. Preferably, the power supply 48 in the assembled computer is made of high-quality standard components.

Hard drives 56, 235, 236 and 240 may be mounted within the chassis 2. Other hard drive configurations are possible as well. It is also possible to provide various brackets elsewhere within chassis body 4 to mount additional hard drives as space permits. Hard drives may be placed in hard drive frames 230 to simplify assembly, stabilize the drives, control their location, and (by that location control,) also control airflow. The frames also act to conduct heat away from the hard drives.

The cooling of main board compartment 8 may be provided by fans 76 which may run all the time while the computer is on or alternately some or all of fans 76 may be subject to more selective control. For instance, a thermal control unit may be included in the computer design. The thermal control unit may be set to monitor the temperature of the chamber and turn on and off fans or the device itself to help desired and/or constant maintain temperatures. This can reduce thermal cycling issues that may arise due to differing power consumption and waste heat generation of components (especially CPUs) depending on their usage.

Depending on the placement and selection of components used to build a computer in inventive chassis 2, the placement of the vents in the rear on the back panel or side panels 38 or 40 may be varied. Back vents 80 and fans 76 in front of back vents 80 are provided to generate a beneficial stream of air for cooling power supply 48, main boards 14 and 204, and drives 56, 235, 236, and 240. When airflow through the chassis is desired, vents 84 will also be provided in front panel 18. Fans may also be placed in front of vents 84. These fans may be configured in a manner similar to that of the fan/vent configuration near the rear of chassis 2. This fan/vent assembly may also direct additional cooling air over or near the CPU(s) of first main board 14 and second main board 204 in addition to the other components.

Any desired airflow may travel from the front section to the rear section. Alternately, it may travel in the other direction and/or with a sideways vector component and/or with a vertical vector component. The direction of air flow may be set depending on the desired effect on the environment or even be switchable to account for changing environmental conditions such as variations in the temperature of the site housing the computers due to changing seasons or the difference in environmental temperatures between day and night.

Optional lid vents 251 and optional floor vents 252 may be placed anywhere or in any number as desired to further aid and direct airflow within chassis 2. Vents 251 and 252 are especially useful for generating stronger airflow directed at specific components such as CPUs. Further, details of such venting features are more fully described in the Provisional Application, titled VENTING SYSTEM FOR STACKED COMPUTER CHASSIS, Serial No. 60/270,405, to Giovanni Coglitore filed on even date herewith.

Many power supplies also are built by their manufacturer with their own internal cooling fans and vents, which not only significantly aid in cooling the power supply, but also add to the airflow within the chassis. The same applies to fans mounted on or with other components, such as CPUs and drive motors.

Figure 2:
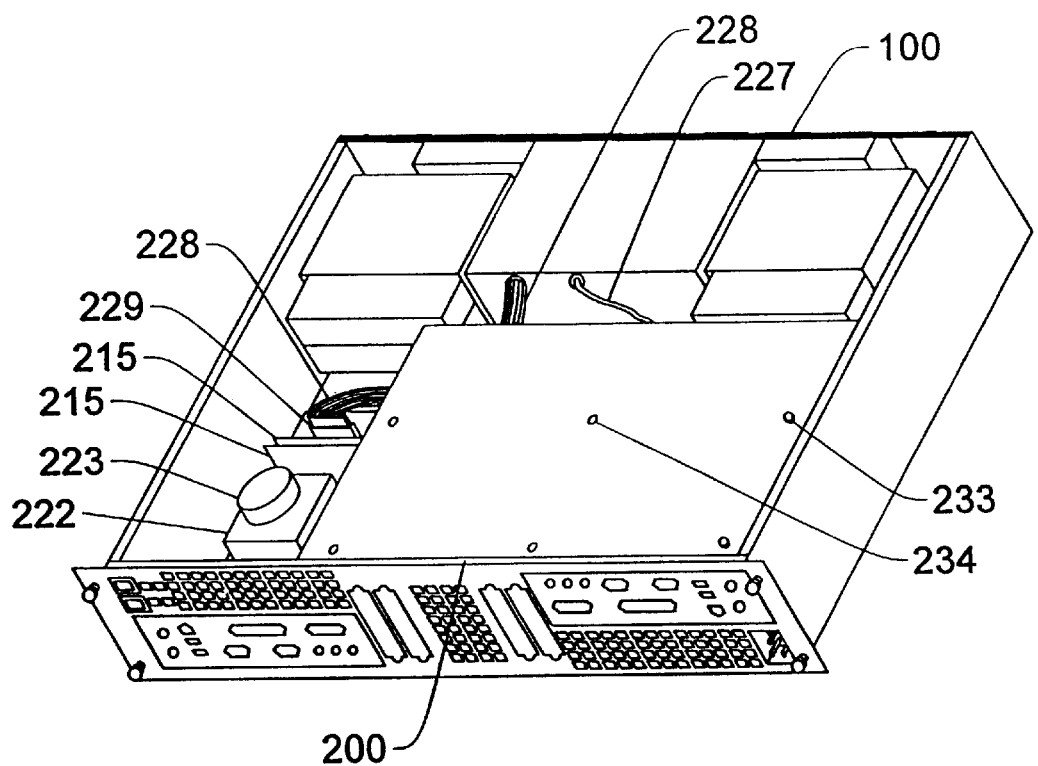
FIG. 2 shows a lidless configuration of the inventive chassis assembled with certain components.

FIG. 2 shows a configuration of the inventive chassis as it may be built-up as shown in FIG. 1 and described above, but modified to function without a chassis cover. Chassis cover 6 need not be used especially if computers so-configured are to be stacked or shelved upon each other so that the bottom of one computer will act as a cover of the computer beneath it. The absence of a lid eases restrictions on airflow through the chassis when used in combination with floor-venting, reduces the number of parts, weight, and cost of the system, and improves serviceability, since the chassis need not be opened to access the components. However, a chassis with chassis cover 6 may be desired for use on top of a computer stack to form an approximately airtight seal within the stack. A closed system allows for optional direction of airflow through vents 80 and 84 and also prevents debris from falling into the top or leading edge chassis.

To aid in stacking chassis, any combination of a raised lip or joggle 200, slide rails 201, and EMI (electromagnetic interference) gasket 100 may be provided. Among other benefits, joggle 200 provides a tighter seal between adjoining stacked or shelved computers and reduces the effort needed to insert and remove the chassis from the shelf by reducing the contact area between chassis. The slide rails 201 also ease insertion and removal of a chassis from a stack or shelf by providing extra surface area to guide one chassis over another so as not to accidentally drop one chassis 2 into the main board compartment 8 of an adjacent chassis and also to reduce contact pressure, and therefore friction, between chassis.

The EMI gasket 100 may be any electromagnetic shield material, such as a SOFT-SHIELD gaskets available from the Chomerics division of Parker Hannifin Corporation (Woburn, Mass.). EMI gasket 100 provides a better mechanical seal between lidless chassis or the chassis cover 6 and chassis 2, and the EMI gasket also helps prevent electro-magnetic interference from entering or exiting the chassis 2.

Preferably, sufficient space exists between main boards 14 and 204 to maintain CPU heat sink 222 and CPU fan 223 on the CPU which is on each main. CPU heat sink 222 and CPU fan 223 aid in cooling the CPU and CPU fan 223 also provides additional airflow within chassis 2. Multiple CPUs may be mounted on each main board. Each is preferably paired with a heat sink and fan. Sufficient height clearance may also exist between the main boards to provide cards 215 extending outward from main boards 204 and 14.

Space is provided in main board compartment 8 to feed power supply cord 227 to power supply 48 from port 46 for the power cord. Power cords 228 connect the power supply 48 to each main board 14 and 204.

Each motherboard support post connects to the motherboard with bolt 223 placed through insulated bolt hole 234. Insulated bolt holes 234 are preferably structurally enforced. The combined structural enforcements for all insulated bold holes 234 should be able to support the weight of the main board. Note that although posts are shown in this embodiment, most insulatable mounting structures that could support the weight of the main boards would suffice.

Figure 3:
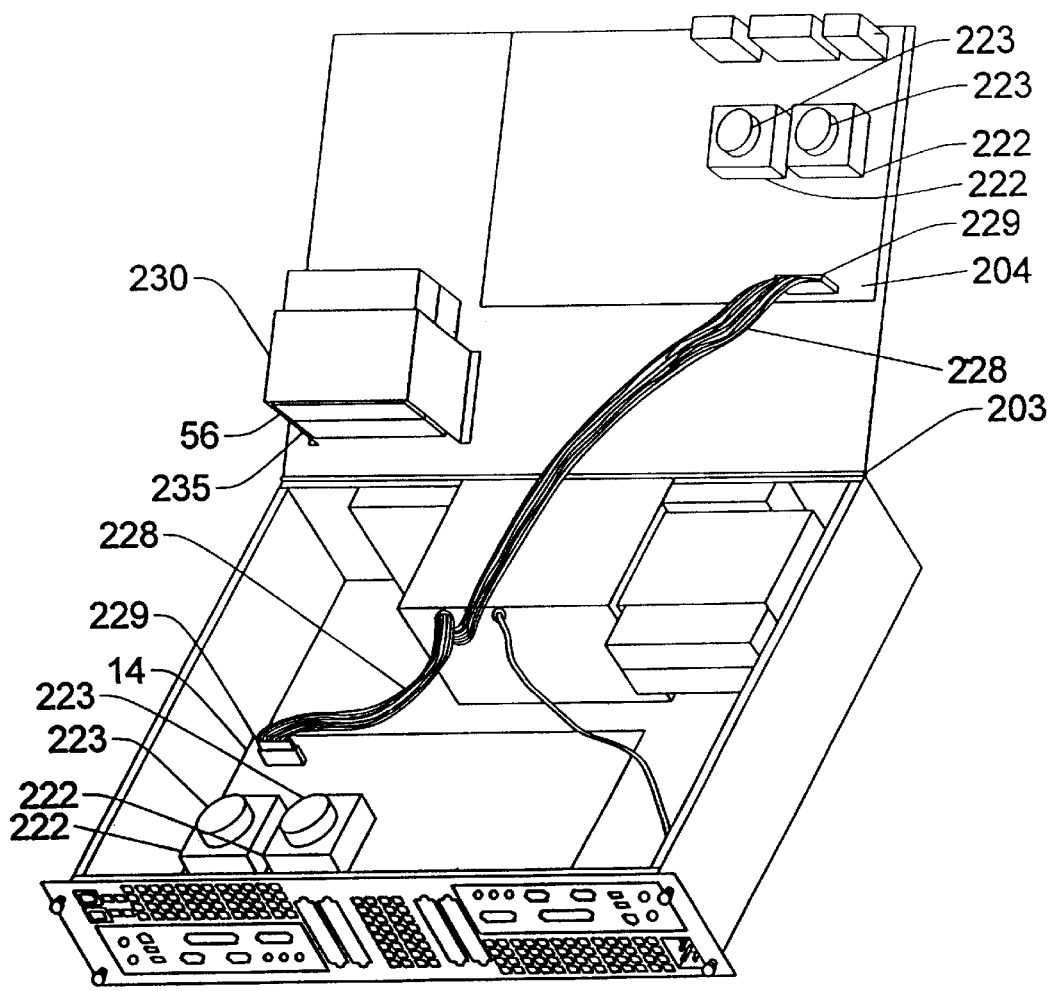
FIG. 3 shows a configuration of the inventive chassis with lid-mounted components.

FIG. 3 shows an embodiment of the inventive chassis where the chassis cover 6 is connected to the chassis 2 with a hinge 203. The hinge 203 may be placed on any edge of the chassis cover 6 and chassis 2.

Components may be mounted on chassis cover 6 or chassis 2. FIG. 3 exemplifies this alternate mounting capability by showing hard drives 56 and 235 within hard drive frame 230 which is itself mounted to chassis cover 6, and by showing second main board 204 mounted on chassis cover 6. Yet the remainder of the components are mounted to chassis 2. Further, details of such lid-mounting features are more fully described in the Provisional Application, titled COMPUTER WITH DUAL-SIDE HARDWARE MOUNTING, Serial No. 60/270,343, to Giovanni Coglitore filed on even date herewith.

As shown in connection with FIG. 3—though possible in any embodiment of the invention—multiple CPUs may be mounted on a single main board. The offset and opposite-facing mounting allows for clearance between the respective main board CPU heat sinks and CPU fans. First main board 14 and the second main board 204 are shown with two CPU heat sink/fan assemblies each. FIG. 3 also exemplifies the ease of installation and connectivity of power cords 228 and power plugs 229 from power supply 48 to main boards 14 and 204 with this hinged chassis cover configuration.

Figure 4:
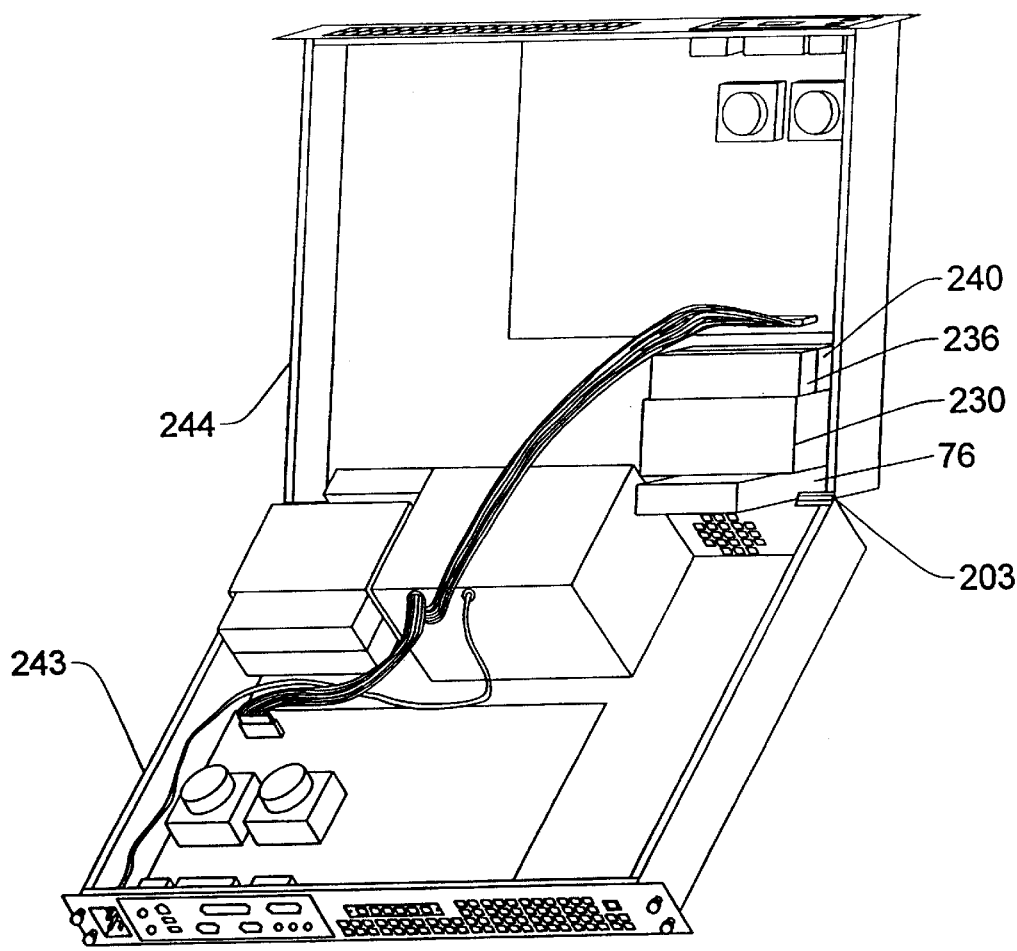
FIG. 4 shows a clamshell configuration of the inventive chassis assembled with certain components.

The embodiment shown in FIG. 4 is modified from the embodiment shown in FIG. 3. Instead of using chassis 2 and chassis cover 6, this embodiment uses first chassis portion 243 and second chassis portion 244. FIG. 4 also shows an alternate configuration of chassis cover 6 mounting (in the configuration shown in FIG. 4, the second chassis portion 244 acts as the chassis cover) by showing a fan 76 and a different sided set of hard drives 236 and 240 in their hard drive frame 230 mounted on second chassis portion 244. Details of these clamshell features are more fully described in the Provisional Application, titled COMPUTER WITH DUAL-SIDE HARDWARE MOUNTING, Serial No. 60/270,343, to Giovanni Coglitore.

Figure 5:
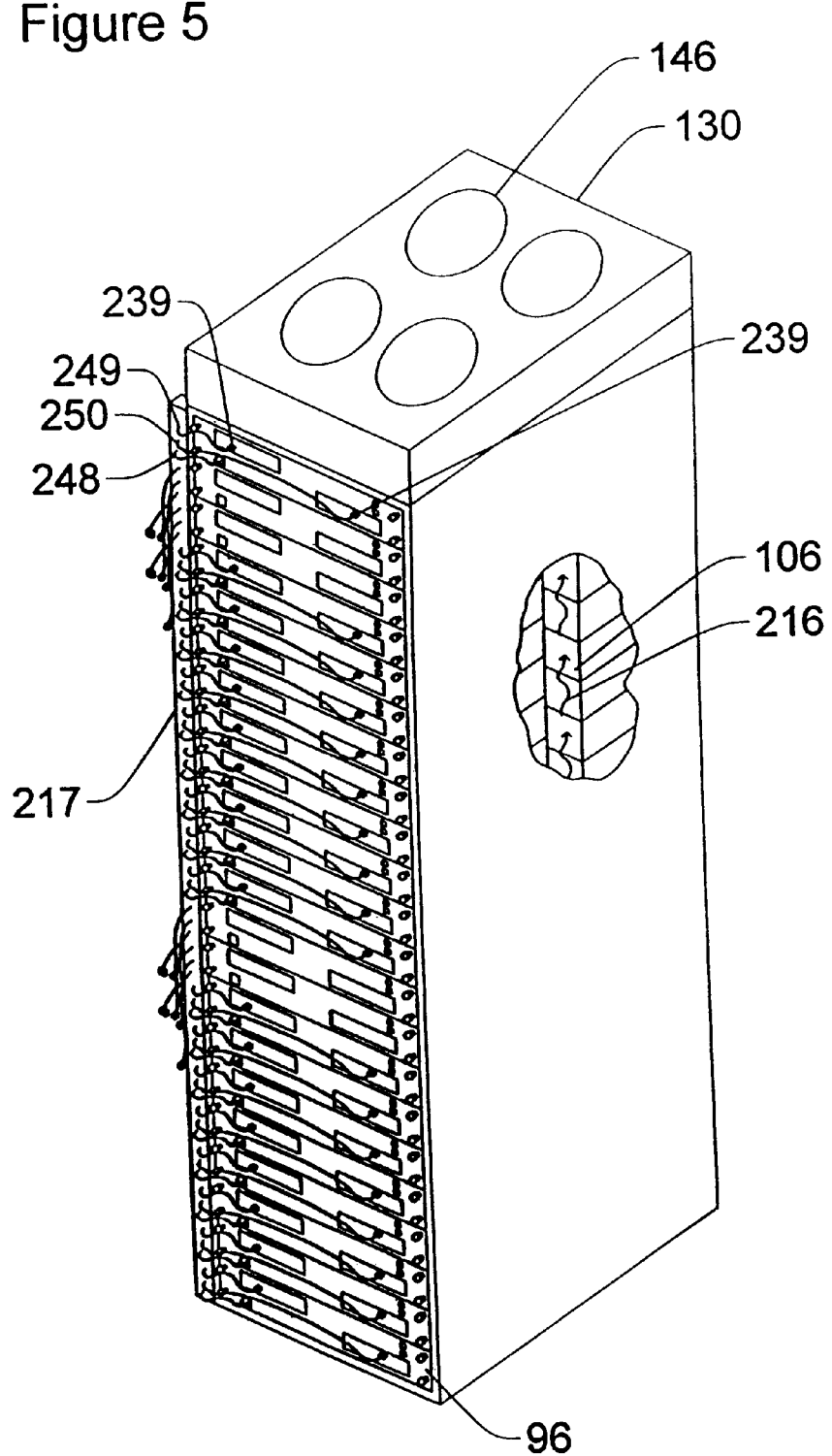
FIG. 5 shows a standard 19 inch rack-mounted system including a hood with fans.

Full computers may be built with chassis 2, and may be provided in a back-to-back configuration, as exemplified by the configuration shown in FIG. 5 which shows a stack of chassis 96 in a cabinet. Preferably the computers are hooked up in the manner of a farm. It may be preferred that back-to-back pairs of computers such as these are mounted in a standard rack in one layer after another as shown in FIG. 5. They may be mounted to the rack on slides, by their front plate 18 or otherwise. When no slide is used, but covers are, it may be preferred to place strips of adhesive TEFLON tape or the like on the surface of at least one computer under or above another. While the chassis are sufficiently strong and the assembled units light enough to be self-supporting when bolted in to a rack, the tape takes up space to provide support and make sliding a unit out from a rack for service more convenient.

The rack shown in FIG. 5 will hold up to 44 chassis 2 built with the 2 U inventive design. As alluded to above, this is because the use of the chassis in a back-to-back configuration permits the doubling of the number of computers that may be stored in a standard rack (of course, when utilizing chassis or racks of different heights, this ratio will change).

To do this with symmetrical chassis 2 as is preferred, regardless of the height of chassis 2, the intrusion of the rear of the chassis into the rack must be less than half the available depth of the rack. Various ways in which to accomplish this are described in 1.00. This is so because when a sufficient number of computers are placed back-to-back in a rack as possible in connection with the present invention, an advantageous back space or chimney 106 is formed behind the computers. When side panels are provided on the rack, back space 106 is complemented by side space between sides 38 and 40 of chassis 2 and the rack side panels to form an H-shaped space. The space behind the computers may, however, be cordoned off to leave only a rectangular volume if desired.

It is highly undesirable to have the air space cluttered by other structure such as cables, cords and the like. This is why the front-access configurations of the inventive chassis are advantageously used in conjunction with providing an air space between computer modules within a rack or other enclosure as might be used.

On top of the cabinet, hood 130 with fans 146 may be employed to assist airflow 216, which may move in either direction, in backspace 106 between two stacks of chassis 96. Backspace airflow 216 aids the airflow by producing either a positive or negative pressure assist corresponding to whether airflow out of or into the front of the chassis is preferred respectively. The fans can be configured to connect directly to the HVAC system of the building or room in which stack of chassis 96 are located. Generating this uni-directional flow through the computer chassis avoids recirculation of air typical of standard computer chassis which hinders cooling. Further advantages of chimney/back or side space with the chassis is described in the U.S. patent application Ser. No. 09/479,824 entitled HIGH DENSITY COMPUTER EQUIPMENT STORAGE SYSTEM, filed Jan. 7, 2000, by Coglitore et al.

FIG. 5 also shows the inventive system in use with power/network distribution bar 217. Power/network distribution bar 217 may be mounted onto or next to the cabinet, preferably near stack of chassis 96 or may be integrated into the cabinet. Power/network distribution bar 217 is connected to the desired external computer network and an external power source. Power/network distribution bar 217 then distributes the power and network connection to chassis 2 in stack of chassis 96 via power cords 248 and network cords 249 and 250, respectively. Network cords 249 and 250 and power cords 248 are spaced so that they align with computer chassis 2 in stack of chassis 96. Although not necessary, it is also beneficial to align network cords 249 and 250 and power cords 248 on power/network distribution bar 217 with their respective connections on chassis 2.

For the shown embodiment of the inventive chassis, network cords 249 and 250 are preferably provided as first network cords 249 and second network cords 250. Each first network cord could be spaced to easily supply a network connection to first main board 14 and each second network cord could be spaced to easily a network connection to second main board 204. Appropriate alternate power/network distribution bar configurations could be used with different chassis set-ups. Network cords may be activated or deactivated as desired. As shown in FIG. 5, various network cords can be left unplugged at random without affecting network distribution to the remaining chassis. The same applies for the power cords.

Power cords 248, just like network cords 249 and 250, may also be provided in a denser or less dense configuration, and various cords may be disconnected or deactivated, especially to account for different "U" heights of chassis.

Furthermore, network cords 249 and 250 and power cords 248 may be retractable, automatically, manually, or semi-automatically, into power/network distribution bar 217. Details of such power/network distribution features are more fully described in the Provisional Application, titled DISTRIBUTION BAR FOR COMPUTER NETWORKING, Serial No. 60/270,403, by Giovanni Coglitore filed on even date herewith.

Figure 6:
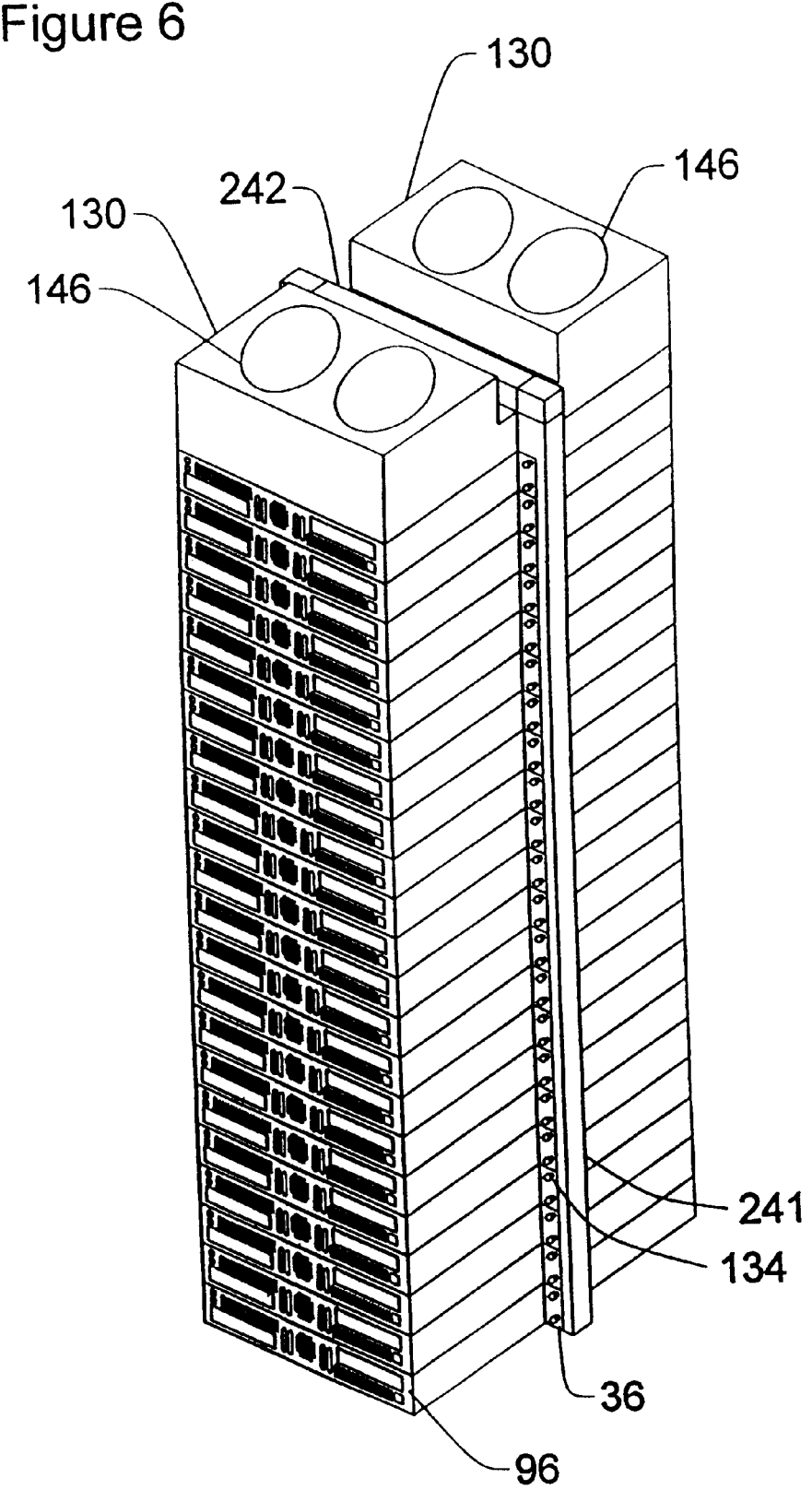
FIG. 6 shows a telco-mounted system including a hood with fans.

FIG. 6 shows a configuration of the inventive chassis 2 used in connection with a telco-style rack. In this variation interface sections 36 are placed at the back of chassis 2 and enable connecting the rear of the chassis to telco beams 241 via fasteners. Crossbeam 242 may be used to stabilize the stack and also to create a closed airflow channel between stacks of chassis 96.

On top of the stack of chassis 96 is a pair of hoods 130. Each hood 130 has its own fans 146. Hoods 130 are preferably L-shaped and fit tightly between crossbeam 242 and the top of the stack of chassis 96. There is a nearly air-tight seal between hoods 130, cross beam 242, telco beams 241 and the top of stack of chassis 96. This configuration provides airflow control in backspace 106 formed between the chassis and support structure in the same manner that backspace airflow 216 control was created and utilized as described above and shown in FIG. 5 and as described in the U.S. patent application Ser. No. 09/479,824 entitled HIGH DENSITY COMPUTER EQUIPMENT STORAGE SYSTEM, filed Jan. 7, 2000, by Coglitore et al.

The configuration shown in FIG. 6 is preferably connected in the manner described above. Also it is to be understood that it be altered, by utilizing only one stack of chassis 96. Further, mounting may be done against a wall or other structure instead of against telco beam(s) 241 with or without provision for a backspace. The wall may also have protruding beams to mount the chassis 2 which provides backspace 106 to allow for backspace airflow 216, described in detail above.

Details of such rear-mount chassis features are more fully described in the Provisional Application, titled REAR-MOUNT COMPUTER CHASSIS SYSTEM, Serial No. 60/270,338 filed on even date herewith and the U.S. Design Patent Application, titled BANK OF COMPUTER CHASSIS MOUNTED TO RACK BARS, Ser. No. 29/137,456 filed on even date herewith, each to Giovanni Coglitore.

Figure 7:
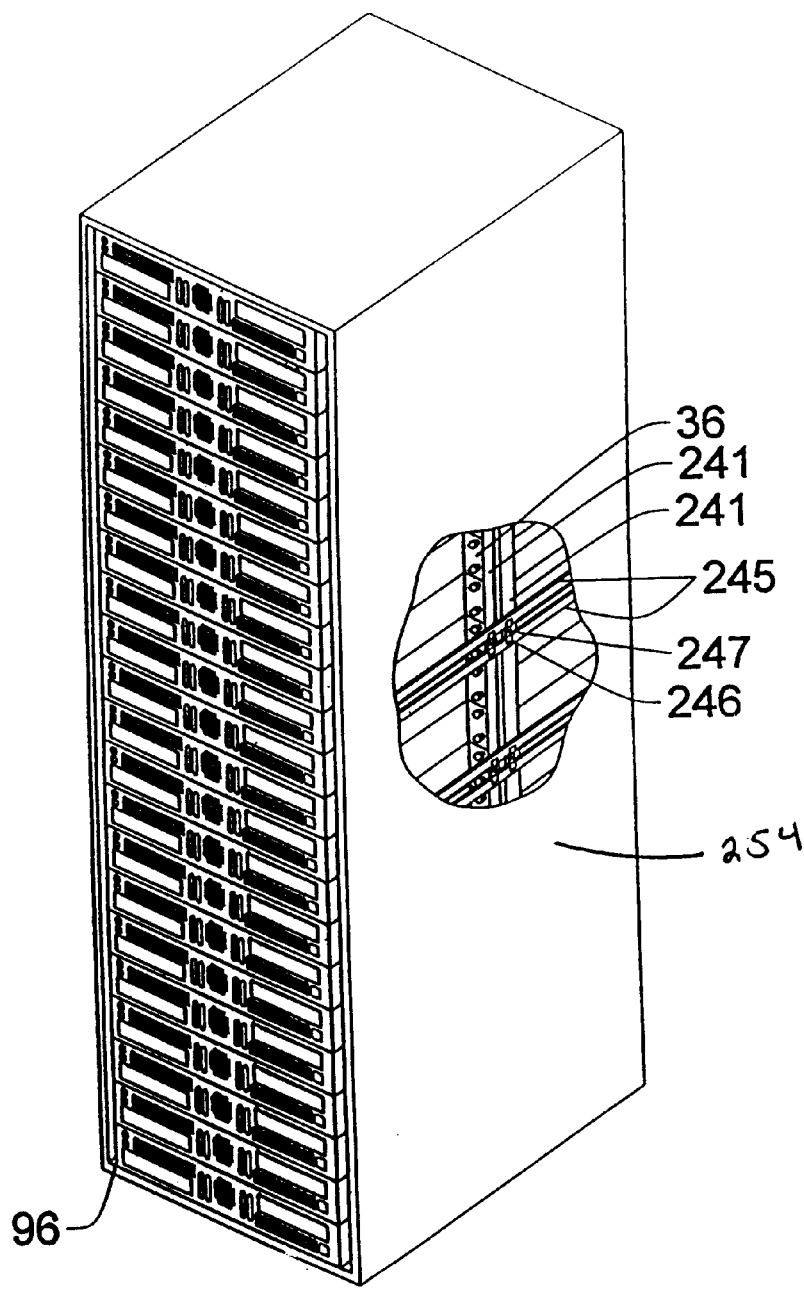
FIG. 7 shows a partial cut-away of a rack filled with computers according to the invention where the computers are mounted to adjustable bars.

FIG. 7 shows a configuration of the inventive chassis mounted in a cabinet including adjustable beams 241. Adjustable beams 241 are themselves slidably mounted to a series of side rails 245 held by a frame within the cabinet. Adjustable beams 241 can be located approximately as shown to accommodate chassis that have interface sections 36 located adjacent to the rear of chassis 2. Adjustable beams 241 can also be moved to the outer edges of the cabinet, thus being useable with chassis that have their interface sections 36 placed adjacent to their front panel 18. Adjustable beams 241 can also be placed in any intermediate position for alternative chassis designs.

In the embodiment shown, side rails 245 are adjustably secured to adjustable beams 241 by bracket 246 which is held on adjustable beams 241 by connector 247.

Different beams 241 may be used for each stack of chassis 96. This allows for the use of different depth chassis in a single rack and also allows setting the fronts of the chassis to different depths to improve the display, usability, serviceability, or removed after snipping of stack of chassis 96. Side panels of the cabinet may be omitted for ease of access to the computers within and adjustable beams 241.

Including the panels to form a complete cabinet is advantageous, however, since it facilitates use of a hood and fans like those shown shown in FIG. 5 and as described in the U.S. patent application Ser. No. 09/479,824 entitled HIGH DENSITY COMPUTER EQUIPMENT STORAGE SYSTEM, filed Jan. 7, 2000, by Coglitore et al. Still, closer spacing between beams 241 or an additional panel placed between adjustable beams 241 would provide an approximately airtight seal without cabinet panels, thereby facilitating the use of a hood and fans like that shown in FIG. 6.

Further details as to the use or other aspects of the system described herein may be drawn from the background that is intended to form part of the present invention, including each of the provisional applications and patent applications cited above, each of which being incorporated by reference herein in their entirety. It is noted that this invention has been described and specific examples or variations of the invention have been portrayed. The use of those specific examples is not intended to limit the invention in any way. Additionally, to the extent that there are variations of the invention which are within the spirit of the disclosure and are equivalent to features found in the claims, it is the intent that the claims cover those variations as well. All equivalents are considered to be within the scope of the claimed invention, even those which may not have been set forth herein merely for the sake of relative brevity. Furthermore, it is contemplated that each and every optional feature of the inventive variations described herein may be specifically excluded from the invention claimed and be so-described as a negative limitation. Also, the various aspects of the invention described herein, in any manner, may be modified and/or used in combination with such other aspects also described to be part of the invention either explicitly, implicitly or inherently in order to form variations considered to be part of the invention.

We claim:

1. A computer system comprising:
   a chassis body configured to receive a first main board and a second main board in an offset and opposed orientation; and
   mounting portions on the chassis body; and
   wherein a front section of said chassis body includes a first I/O port configured to provide access to a first plurality of I/O components provided on the first main board, and a second I/O port configured to provide access to a second plurality of I/O components on the second main board, wherein said first I/O port is situated diagonally across the front section of the chassis from the second I/O port.

2. The computer system of claim 1 including vents in a rear section of the chassis body.

3. The computer system of claim 1 including vents in said front section.

4. The computer system of claim 3 wherein at least two vents in said front section are situated diagonally from each other across said front section.

5. The computer system of claim 1 wherein said mounting portions are located at said front section.

6. The computer system of claim 1 wherein said mounting portions are located at a rear section of the chassis body.

7. The computer system of claim 1 further comprising a cover.

8. The computer system of claim 7 wherein said cover is rotably attached to a base of the chassis body.

9. The computer system of claim 1 wherein said chassis body is formed by chassis sections, each comprising a front section, a rear section, two side sections and a base.

10. The computer system of claim 1, wherein:
    the first main board is provided in a bottom portion of the chassis body, said first main board comprising a first side and a second side, the first side having a plurality of components mounted thereon, said plurality of components including the first plurality of I/O components; and
    the second main board is provided in a top portion of the chassis body, said second main board comprising a first side and a second side, the first side having a plurality of components mounted thereon, said plurality of components including a second plurality of I/O components;
    wherein the first side of the first main board faces the first side of the second main board.

11. The computer system of claim 10 connected as a portion of a network.

12. A system comprising a plurality of computer systems according to claim 10, wherein said computer systems are attached to mounting members in a relation to define a chimney for cooling said computers.

13. The system of claim 12 wherein at least some of said plurality of computer systems are placed in a back-to-back relationship.

14. The system of claim 12 wherein at least one panel opposes at least one of said computer systems to form at least a portion of said chimney.

15. The system of claim 12 wherein said mounting members are in the form of a telco-style rack.

16. The system of claim 12 provided in a cabinet.

17. The system of claim 16 wherein said cabinet includes adjustable beams for mounting chassis thereto.

18. The computer system of claim 10, wherein the first main board and the second main board have the same dimensions.

19. The computer system of claim 18, wherein the first main board and the second main board comprise the same model of main board.

20. The computer of claim 10, wherein a top portion of the chassis body comprises a hinged cover, said second main board being mounted on the hinged cover.

21. The computer of claim 10, further comprising a power supply provided in the chassis body, said power supply being coupled to the first main board and the second main board.

22. A system, comprising:
    a rack; and
    one or more computer systems according to claim 1 mounted in the rack.

* * * * *